J. A. THOMPSON.
Straw Cutter.
No. 13,509.
Patented Aug. 28, 1855.
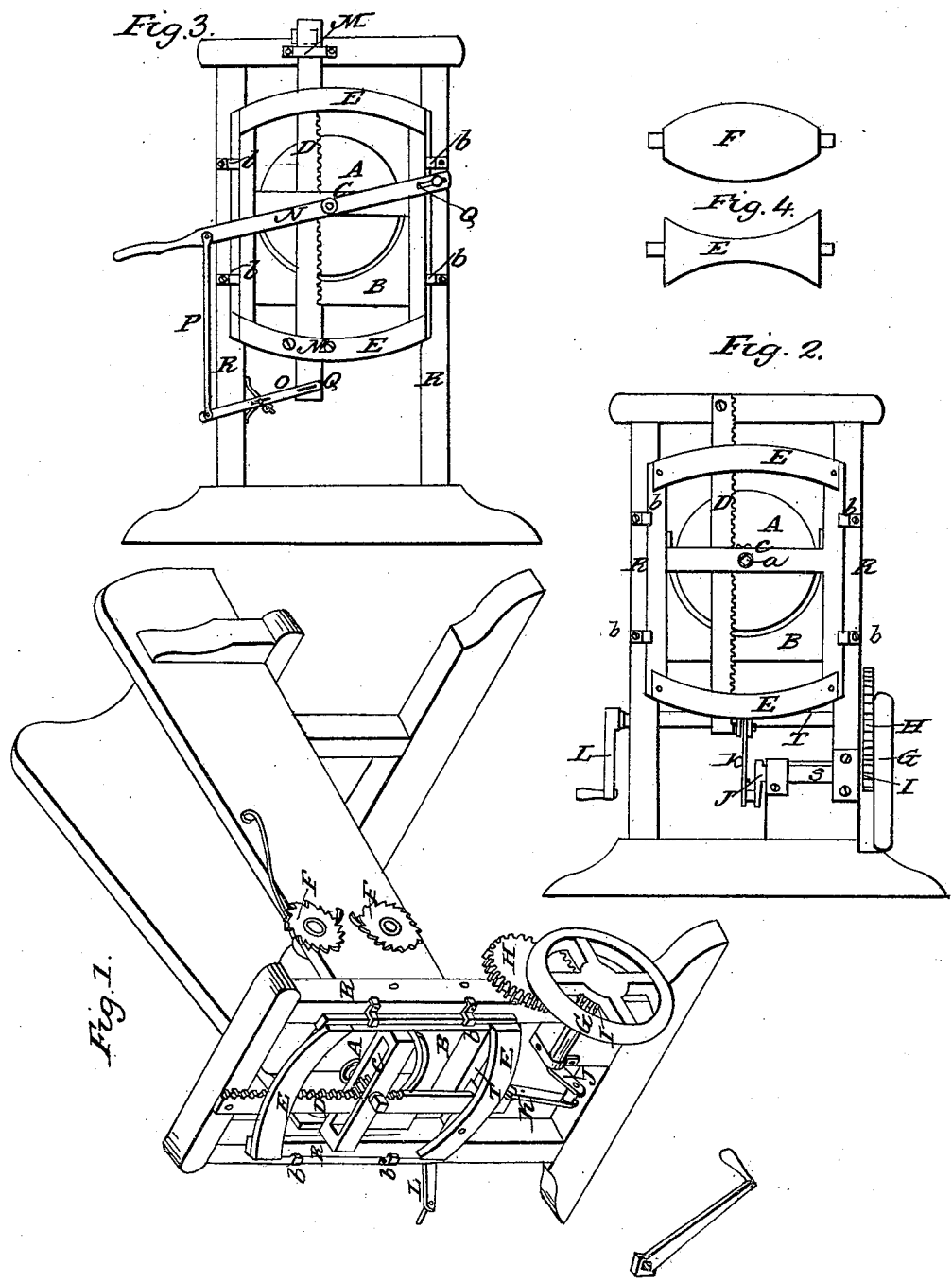

UNITED STATES PATENT OFFICE.

JNO. A. THOMPSON, OF CAYUGA, NEW YORK.

STRAW-CUTTER.

Specification of Letters Patent No. 13,509, dated August 28, 1855.

*To all whom it may concern:*

Be it known that I, JOHN A. THOMPSON, of Cayuga, in the county of Cayuga and State of New York, have invented certain new and useful Improvements in Straw-Cutters; and I do hereby declare the following to be a full, clear, and exact description of the same, reference being had to the accompanying drawings, making a part thereof, in which—

Figure 1, represents a perspective view, Fig. 2 represents a front elevation, Fig. 3, represents a modification of the plans shown in Figs. 1, and 2.

Similar letters in the several figures denote like parts.

The nature of my invention consists, in giving to a disk cutter, in a straw cutting machine, a combined rotary and vertically reciprocating motion.

To enable others skilled in the art to make and use my invention, I will proceed to describe the same with reference to the drawings.

A, represents a disk cutter which may be made of plate steel. It is hung to the gate E, by a short shaft $a$, on which it may freely turn.

B, is a straw box having its bottom part rounded out, to conform to the shape of the cutter A, which is set slightly back of the mouth of said straw box, and the said mouth is provided with rawhide against which, or ledges between which, said cutter may work. The gate E, is secured to the front of the straw box, by guides $b$, in which it may freely work up and down.

A shaft T, extends across the front of the machine below the cutter box, and has its bearings in the front supporting posts R R. On one end of this shaft, Figs. 1, 2, is a crank L, by which motion may be given to the machine, and on the other end of it, is a cog wheel H, which takes into a pinion I, on a shaft S, and gives it motion. A balance wheel G, is arranged on one end of this shaft S, and on the other end is a crank J, to which one end of a pitman K, is attached, the other end of said pitman being connected to the gate E. This arrangement of parts, by simply turning the crank L, gives a reciprocating motion to the gate.

D, is a straight rack, permanently attached to the frame, as represented in Figs. 1, 2, and standing a little to one side of the center of the machine. On the shaft $a$, on which the disk cutter is placed, as before described, is a spur gear C, which as the gate is raised up and down runs in the rack D, and receives a rotary motion thereby, which it imparts to its shaft $a$, and the disk cutter A, upon it. The disk therefore receives a vertically reciprocating motion by the gate, and a rotary motion at the same time through the pinion or spur C, and rack piece D, and thus it rises up to allow the straw to be fed in, and then descends, passing through the straw with a rapid rotary motion, which gives to it a drawing cut.

F, F, are the feed rollers, the lower one being concave to fit the rounded bottom of the straw box, and the upper one convex to fit the lower one. These feed rolls may be provided with ratchets, and rotated periodically by levers or pawls actuated by any of the moving parts of the machine, and in a manner well known, and in common use in such machines.

In Fig. 3, I have represented another method of giving the same combined rotary and reciprocating motion to the disk. In this plan the gate is raised up and down by a brake or lever N, and a rod P, connects the brake N, with another lever O, having its fulcra at Q, or at or near its center. The lever O, at the end opposite to where the rod P, is attached to it, is connected to the rack piece D, which instead of being stationary as in Figs. 1, 2, is allowed to move in the guides M, M, and through its several connections moves in a direction always contrary to that of the gate. This of course increases the motion of the disk materially over that of the fixed rack as in Figs. 1, 2, as motion is given to both the pinion C, and to the rack D. Either plans work equally well, and either may be used as more or less motion may be required with the cutter.

Having thus fully described the nature of my invention, what I claim therein as new and desire to secure by Letters Patent is—

Giving the cutting disk of a straw cutter, a combined rotary and reciprocating motion, substantially in the manner, and for the purpose set forth.

JOHN A. THOMPSON.

Witnesses:
  THOS. H. UPPERMAN,
  E. COHEN.